United States Patent
Choi et al.

(10) Patent No.: US 8,543,150 B2
(45) Date of Patent: Sep. 24, 2013

(54) CLUSTERING METHOD AND COMMUNICATION DEVICE FOR COORDINATED MULTIPOINT TRANSMISSION

(75) Inventors: Hyun Ho Choi, Suwon-si (KR); Kyung Hun Jang, Suwon-si (KR); Hyo Sun Hwang, Seoul (KR); Jong Bu Lim, Pohang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 692 days.

(21) Appl. No.: 12/637,784

(22) Filed: Dec. 15, 2009

(65) Prior Publication Data

US 2010/0304682 A1 Dec. 2, 2010

(30) Foreign Application Priority Data

May 29, 2009 (KR) .................. 10-2009-0047627

(51) Int. Cl.
*H04B 7/00* (2006.01)
*H04B 15/00* (2006.01)

(52) U.S. Cl.
USPC ........... 455/502; 455/500; 455/507; 455/450; 455/524; 455/525; 370/329; 370/252

(58) Field of Classification Search
USPC .............. 455/500, 501, 502, 507, 450–452.2, 455/524, 561, 101, 525; 370/329, 252, 464
See application file for complete search history.

(56) References Cited

U.S. PATENT DOCUMENTS

| | | | |
|---|---|---|---|
| 6,694,141 B1 | 2/2004 | Pulkkinen et al. | |
| 7,801,074 B2 * | 9/2010 | Kim et al. | 370/329 |
| 2006/0234755 A1 | 10/2006 | Jonsson et al. | |
| 2008/0298486 A1 | 12/2008 | Venturino et al. | |
| 2009/0129327 A1 * | 5/2009 | Horn et al. | 370/329 |
| 2010/0189047 A1 * | 7/2010 | Baum et al. | 370/329 |
| 2011/0007657 A1 * | 1/2011 | Kazmi et al. | 370/252 |

FOREIGN PATENT DOCUMENTS

| | | |
|---|---|---|
| KR | 1020050019945 | 3/2005 |
| KR | 1020080064721 | 7/2008 |
| KR | 1020040004462 | 2/2009 |
| WO | WO 2009/024614 | 2/2009 |

* cited by examiner

*Primary Examiner* — Wesley Kim
(74) *Attorney, Agent, or Firm* — NSIP Law (57) ABSTRACT

A communication system performing a coordinated multipoint transmission is provided. A mobile station may measure expected channel quality information when an interference of a serving base station does not exist. The serving base station may determine whether a neighbor base station and the serving base station are eligible to perform the coordinated multipoint transmission. The serving base station may determine whether the neighbor base station and the serving base station are eligible to perform the coordinated multipoint transmission using a criterion associated with an evaluation of an increase in a transmission rate of the mobile station.

22 Claims, 9 Drawing Sheets

3: FRAGMENT OF SERVING CELL

{ CoMP COOPERATING SET : 1, 2, 3, 4, 5, 6, 7, 8 }

⇓ CLUSTERING ALGORITHM

{ CoMP REPORTING SET : 1, 2, 3 }

⇓ CHANNEL INFORMATION

{ CoMP TRASMISSION POINTS : 2, 3 }

(RADIO RESOURCE GRID OF CELL A)

(RADIO RESOURCE GRID OF CELL B)

(RADIO RESOURCE GRID OF CELL C)

RADIO RESOURCE GRID OF
SERVING BS 0

RADIO RESOURCE GRID OF
NEIGHBOR BS i

CLUSTERING METHOD AND COMMUNICATION DEVICE FOR COORDINATED MULTIPOINT TRANSMISSION

CROSS-REFERENCE TO RELATED APPLICATION

This application claims the benefit under 35 U.S.C. §119(a) of a Korean Patent Application No. 10-2009-0047627, filed on May 29, 2009, in the Korean Intellectual Property Office, the entire disclosure of which is incorporated herein by reference for all purposes.

BACKGROUND

1. Field

The following description relates to a communication system performing a coordinated multipoint transmission (CoMP).

2. Description of the Related Art

In a coordinated multipoint transmission (CoMP), a plurality of base stations simultaneously cooperates to increase a transmission rate of a single terminal having a weak signal; for example, terminals located in an edge of a cell that transmits a signal. A plurality of study groups conducted much research on a CoMP for a $3^{rd}$ Generation Partnership Project Long Term Evolution (3GPP LTE) specification. Algorithms to perform a CoMP may include coordinated silencing, coordinated scheduling/beamforming, joint processing/transmission, and the like.

In a cellular communication system, a channel state of the terminals may change, and interference may occur in terminals due to a variety of factors, since terminals may be portable. Accordingly, there may be a need to determine whether a particular neighbor base station participates in a CoMP, and to apply the CoMP to the cellular communication system.

That is, applying a CoMP may increase the overhead of a communication system, and; thus, it may not be compulsory to use a CoMP anytime or to join any neighbor base station in a CoMP. For example, when a particular neighbor base station joins a CoMP, a transmission rate may not be significantly improved and an overhead of a communication system may increase.

SUMMARY

According to one general aspect, there is provided a method for clustering a coordinated multipoint transmission of a serving base station, the method including receiving expected channel quality information from a neighbor base station to a mobile station, and determining whether the neighbor base station is eligible to perform the coordinated multipoint transmission with the serving base station based on the expected channel quality information, wherein the expected channel quality information is computed when it is assumed that an interference of the serving base station with respect to the neighbor base station is non-existent in substance or removed.

The determining may include checking whether a criterion is satisfied, wherein the criterion being associated with an evaluation of an increase in a transmission rate of the mobile station according to the coordinated multipoint transmission based on the expected channel quality information, and determining whether the neighbor base station is eligible to perform the coordinated multipoint transmission based on a result of the checking.

The determining may include predicting an increase in a transmission rate of the mobile station according to the coordinated multipoint transmission based on the expected channel quality information, and determining whether the neighbor base station is eligible to perform the coordinated multipoint transmission based on the predicted increase in the transmission rate.

When the coordinated multipoint transmission is performed in a plurality of modes, the determining may include checking whether a criterion is satisfied, the criterion being associated with an evaluation of an increase in a transmission rate according to a change from a current mode of the coordinated multipoint transmission to a particular mode based on the expected channel quality information, and determining whether the neighbor base station is eligible to perform the coordinated multipoint transmission in the particular mode based on a result of the check.

The expected channel quality information may be computed by the mobile station based on a reference signal transmitted by the neighbor base station in a radio resource region which is not used by the serving base station.

The method may further include receiving channel quality information from the mobile station to the serving base station, wherein, the determining may decide whether the neighbor base station and the serving base station are eligible to perform the coordinated multipoint transmission based on the expected channel quality information and the channel quality information.

The determining may provide a weight to at least one of the expected channel quality information and the channel quality information to determine whether the neighbor BS is eligible to perform the coordinated multipoint transmission.

The receiving may include acquiring periodically the expected quality information, or acquiring the expected channel quality information after instructing the mobile station to report the expected channel quality information.

The method may further include providing the mobile station with information about the neighbor base station to enable the mobile station to compute the expected channel quality information.

The method may further include instructing the mobile station to report the expected channel quality information based on channel quality information from the serving base station to the mobile station.

The method may further include providing the mobile station with scheduling information to perform the coordinated multipoint transmission or cell information of the coordinated multipoint transmission when the neighbor base station is determined to be eligible to perform the coordinated multipoint transmission with the serving base station.

The channel quality information may include information about a signal to interference plus noise ratio from the serving base station to the mobile station, and the signal to interference plus noise ratio is computed when it is assumed that an interference of the serving base station with respect to the neighbor base station is non-existent in substance or removed.

According to another general aspect, there is provided a method for clustering a coordinated multipoint transmission of a serving base station, the method including checking whether a criterion, associated with an evaluation of an increase in a transmission rate according to the coordinated multipoint transmission of a neighbor base station and the serving base station, or a criterion, associated with an evaluation of an increase in a transmission rate according to a change of a current mode of the coordinated multipoint transmission to a particular mode, are satisfied, and determining whether the neighbor base station is eligible to perform the coordinated multipoint transmission with the serving base station based on a result of the checking, or whether the neighbor base station is eligible to perform the coordinated multipoint transmission in the particular mode.

The method may further include obtaining a channel quality information from the serving base station to a mobile station, or an expected channel quality information from the neighbor base station to the mobile station, wherein the determining checks whether at least one of the criteria is satisfied based on the channel quality information and the expected channel quality information.

The expected channel quality information may be computed by the mobile station based on a reference signal transmitted by the neighbor base station in a radio resource region which is not used by the serving base station.

According to still another general aspect, there is provided an operation method of a mobile station for a coordinated multipoint transmission, the method including computing an expected channel quality information from a neighbor base station to the mobile station when an interference of a serving base station with respect to the neighbor base station is non-existent in substance or removed, and reporting, to the serving base station, the expected channel quality information to enable the serving base station to determine whether the neighbor base station and the serving base station perform the coordinated multipoint transmission.

The method may further include reporting, to the serving base station, a channel quality information from the mobile station to the serving base station.

The reporting of the channel quality information or the reporting of the expected channel quality information may be performed based on the channel quality information.

The computing of the expected channel quality information may compute the expected channel quality information based on a reference signal transmitted by the neighbor base station in a radio resource region which is not used by the serving base station.

The method may further include receiving scheduling information to perform the coordinated multipoint transmission or receiving cell information of the coordinated multipoint transmission when the neighbor base station and the serving base station are determined to be eligible to perform the coordinated multipoint transmission.

The reporting of the expected channel quality information may report the expected channel quality information using a predetermined feedback control channel.

A radio resource, used when the mobile station reports the expected channel quality information using the feedback control channel, may be assigned by the serving base station.

According to yet another general aspect, there is provided a computer-readable recording medium storing a program for implementing a method for clustering a coordinated multipoint transmission of a serving base station, the method including receiving, by a mobile station, expected channel quality information from a neighbor base station, and determining whether the neighbor base station is eligible to perform the coordinated multipoint transmission with the serving base station based on the expected channel quality information, wherein the expected channel quality information is computed when it is assumed that an interference of the serving base station with respect to the neighbor base station is non-existent in substance or removed.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the apparatuses, methods and/or systems described herein. Accordingly, various changes, modifications, and equivalents of the systems, methods, and/or apparatuses described herein will be suggested to those of ordinary skill in the art. Also, descriptions of well-known functions and constructions may be omitted for increased clarity and conciseness.

As a non-limiting illustration, a 'base station (BS)' may include a general base station, a relay node, and the like, and a 'mobile station (MS)' may include various types of mobile devices such as a cellular phone, a notebook computer, and the like.

Figure 1:
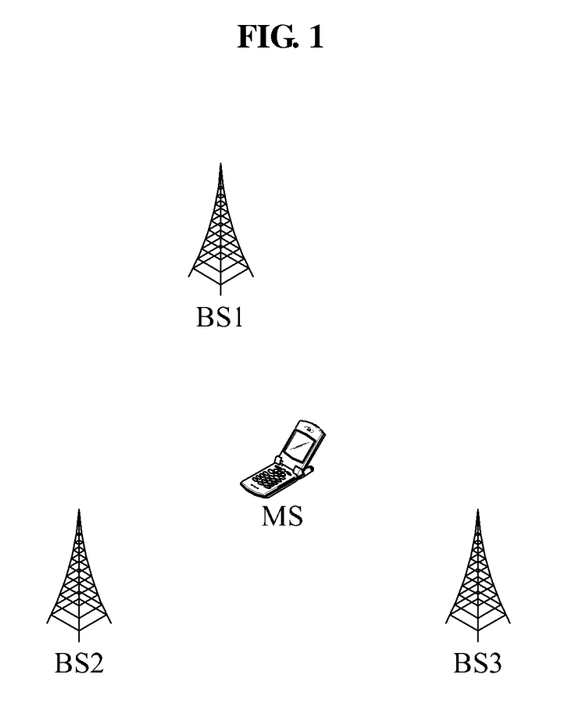
FIG. 1 is a diagram illustrating an example of a communication system performing a coordinated multipoint transmission (CoMP) in a multi-cell environment.

FIG. 1 illustrates an exemplary communication system performing a coordinated multipoint transmission (CoMP) in a multi-cell environment.

As shown in FIG. 1, the communication system in the multi-cell environment may include a plurality of BSs, BS1, BS2, and BS3, and at least one MS.

It may be assumed that a plurality of the BSs, BS1, BS2, and BS3, participate in the CoMP. Here, BS1, BS2, and BS3 may simultaneously transmit a signal to the MS in cooperation with each other. BS1, BS2, and BS3 joining the CoMP may be selected from a plurality of BSs.

For example, a BS or a MS in a communication system where the CoMP is applied may manage a CoMP set. The CoMP set may be a set of BSs that may join the CoMP, and may be sorted into a plurality of sets.

A set of BSs adjacent to a serving BS that may receive a sync channel may be defined as a measurement set. Here, the serving BS and a corresponding MS may receive the same sync channel. Also, a set of BSs that may use the CoMP in substance may be defined as a CoMP cooperating set. The CoMP cooperating set may be determined when a network is deployed. Also, a CoMP reporting set may indicate a set of BSs corresponding to a significant measurement result that is reported to the serving BS, after a corresponding MS measures the signals of BSs.

An operation of determining the CoMP reporting set from the CoMP cooperating set may be performed based on a clustering algorithm, which is described below. Also, the CoMP reporting set may be dynamically determined using a predetermined clustering algorithm depending on a channel state of a MS. Accordingly, the CoMP reporting set may be referred to as a user equipment-specific clustering set.

Figure 2:
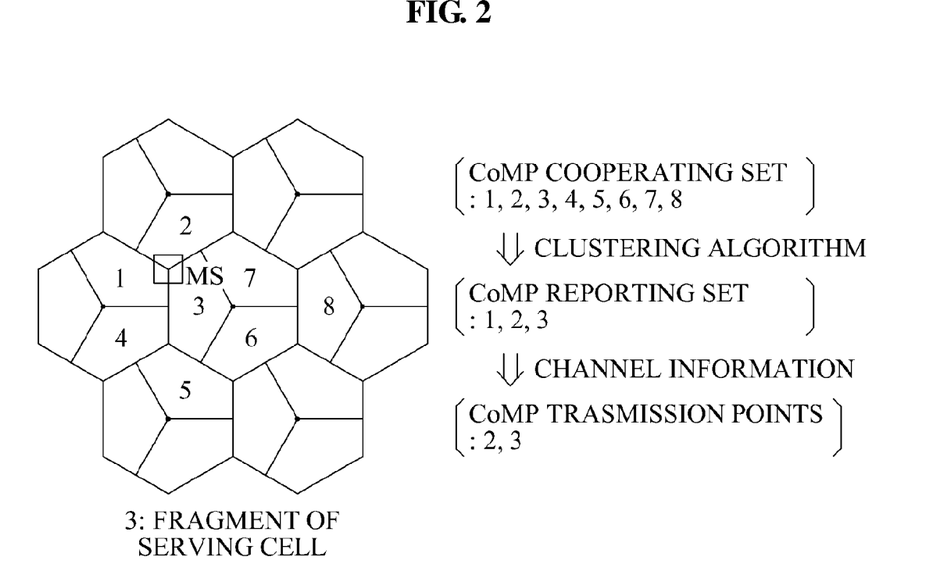
FIG. 2 is a diagram illustrating an example of a clustering algorithm to perform a CoMP.

FIG. 2 illustrates an example of a clustering algorithm to perform by a CoMP.

As shown in FIG. 2, a MS is located at the edge of cell 1, cell 2, and cell 3. A transmission rate of the MS located at the edge may be improved by applying a CoMP.

A CoMP cooperating set may include a plurality of cell fragments. For example, in FIG. 2, it may be assumed that a serving cell of the MS is a cell including a cell fragment 3, and the CoMP cooperating set includes cell fragments 1, 2, 3, 4, 5, 6, 7 and 8. In this case, a CoMP reporting set may be determined from the CoMP cooperating set using the predetermined clustering algorithm. Here, the CoMP cooperating set may include the cell fragment 1, the cell fragment 2, and the cell fragment 3.

Also, when the CoMP reporting set is determined, a network may finally determine which BSs to perform the CoMP. For example, the MS may provide a serving BS of the serving cell with channel information between the MS and BSs including the CoMP reporting set. Also, the serving BS may finally determine the BSs to perform the CoMP from among the BSs included in the CoMP reporting set based on the channel information.

Basic Clustering Standard of Exemplary Implementations

The basic clustering standard may be whether to increase a transmission rate of a MS. That is, a transmission rate of the MS when a target BS does not apply a CoMP may be compared with a transmission rate of the MS when the target BS applies the CoMP based on a current channel state of the MS. Accordingly, it may be determined whether to select the target BS as a BS to join the CoMP.

It may be determined whether to select the target BS as the BS to join the CoMP, according to Equation 1:

$$R^- \leq R^+ - \Delta \quad \text{[Equation 1]}$$

where $R^-$ may denote the transmission rate of the MS when the target BS does not apply the CoMP, and $R^+$ may denote the transmission rate of the MS when the target BS applies the CoMP. Also, $\Delta$ may denote a value corresponding to an overhead additionally generated by applying the CoMP. That is, when Equation 1 is satisfied, the CoMP may be applied, and when Equation 1 is not satisfied, the CoMP may not be applied.

Also, $\Delta$ may be represented as a function of a CoMP algorithm, a channel state, and a mobility according to Equation 2:

$$\Delta = F(\text{CoMP algorithm, channel state, mobility}) \quad \text{[Equation 2]}$$

where the CoMP algorithm may indicate algorithms performing the CoMP, and include a coordinated silencing, coordinated scheduling/beamforming, joint processing/transmission, and the like. That is, $\Delta$ may be represented as the function of the CoMP algorithm, the channel state, and the mobility, and may be defined in various ways.

Overhead Due to Orthogonal Reference Signals

Channels between BSs and a MS are to be estimated to determine whether a target BS is determined as a BS to join a CoMP, or to determine whether the BSs apply the CoMP to a particular MS. Accordingly, reference signals are to be transmitted to the MS through different radio resources to estimate the channels. Also, the BSs are to discontinue transmission of data signals while the reference signals are transmitted, which is described with reference to FIG. 3.

Figure 3:
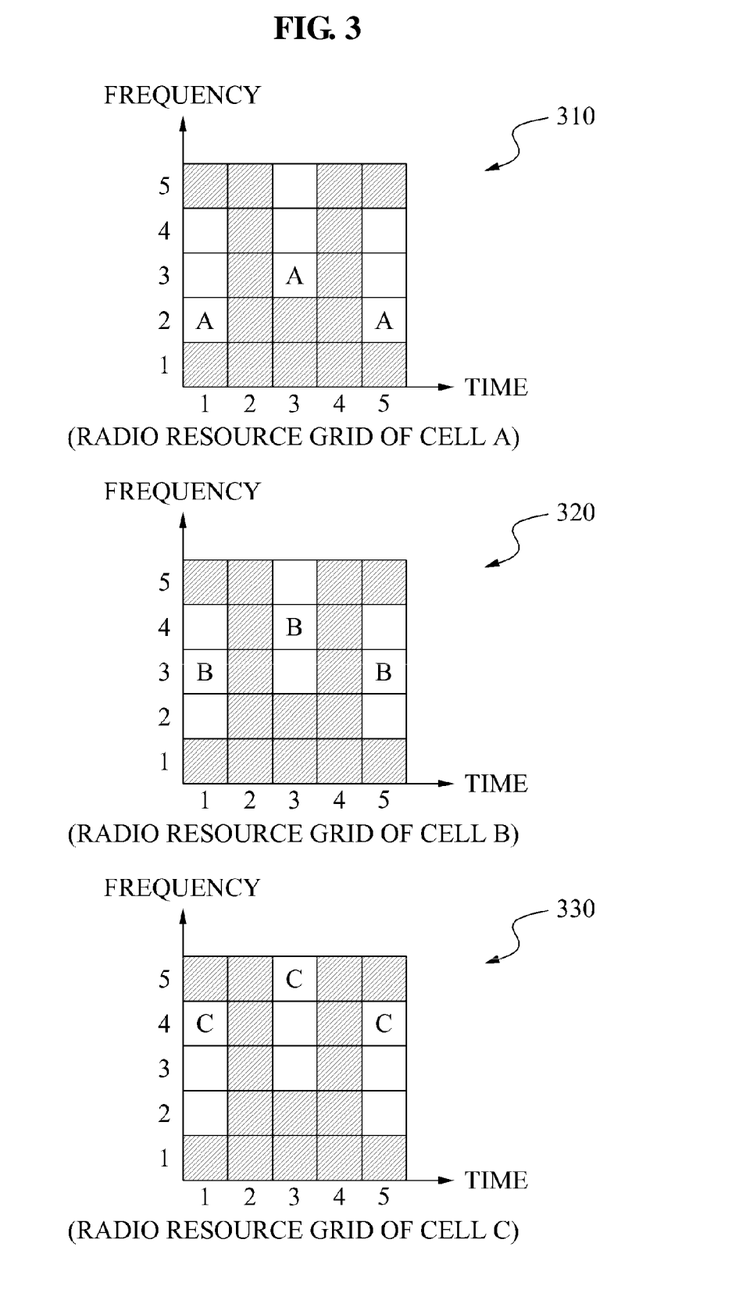
FIG. 3 is a diagram illustrating an example of a radio resource grids assigned for reference signals and data signals.

FIG. 3 illustrates an example of a radio resource grids assigned for reference signals and data signals.

In grids 310, 320, and 330 of FIG. 3, a horizontal axis indicates a time and a vertical axis indicates a frequency. A may denote a reference signal of a cell A (or a BS A), B may denote a reference signal of a cell B (or a BS B), and C may denote a reference signal of a cell C (or a BS C).

Each of the grids 310, 320, and 330 may include 25 (5×5) resource elements (REs). Grey REs may be used to transmit the data signals, and white REs may not be used by a corresponding BS. That is, the corresponding BS may discontinue transmitting/receiving the data signals to prevent an interference to another BS in a time and frequency corresponding to the white REs.

Referring to the grids 310, 320, and 330, it may be ascertained that remaining BSs do not use an RE corresponding to a reference signal, while any one BS transmits the reference signal. For example, when the BS A transmits a reference signal in a first time period and in a second frequency, the BS B and BS C may not use the first time period and the second frequency.

For example, as shown in FIG. 3, when a number of coordinating BSs increases a number of REs, which may not be used by any BS, may also increase. As soon as a channel determines whether to apply the CoMP, the unusable REs may be generated for the channel. The unusable REs may reduce a throughput of a communication system or each cell.

Clustering Algorithm According to Exemplary Implementations

Figure 4:
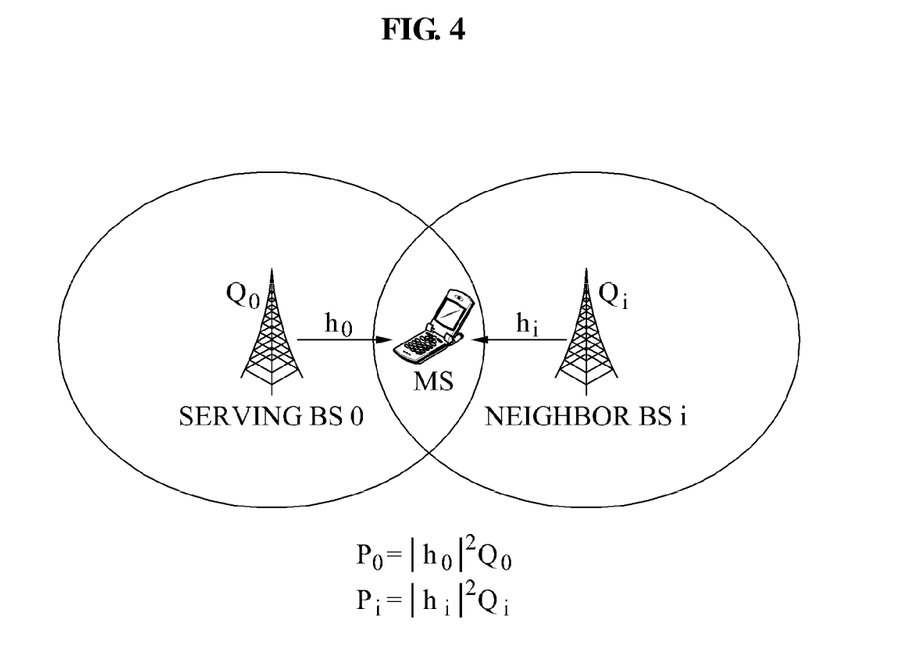
FIG. 4 is a diagram illustrating an example of an operation of computing expected channel quality information (CQI) and CQI in a communication system.

FIG. 4 illustrates an example of computing operation expected channel quality information (CQI) and CQI in a communication system.

As shown in FIG. 4, a MS receives a signal from a serving BS0 and a neighbor BS i. In FIG. 1, a channel between the MS and the serving BS0 may be $h_0$, and a channel between the MS and the neighbor BS i may be $h_i$. Also, $Q_0$ and $Q_i$ may denote a transmission power of the serving BS0 and a transmission power of the neighbor BS i, respectively. $P_0$ and $P_i$ may denote a receiving power of the MS with respect to a signal of the serving BS0, and a receiving power of the MS with respect to a signal of the neighbor BS i, respectively.

$P_0$ and $P_i$ may be represented in Equation 3.

$$P_0 = |h_0|^2 Q_0$$

$$P_i = |h_i|^2 Q_i \quad \text{[Equation 3]}$$

The MS may report to the serving BS0 on a CQI to determine whether to apply the CoMP. The CQI may be associated with information about a signal to interference plus noise ratio ($SINR_0$) with respect to a signal of the serving BS0. Also, the MS may report to the serving BS0 on expected CQI, excluding the signal of the serving BS0. The expected CQI may be associated with information about $E\_SINR_i$. Here, $E\_SINR_i$ may be a $SINR_0$ with respect to the signal of the neighbor BS i.

In this case, $SINR_0$ and $E\_SINR_i$ may be represented in Equation 4:

$$SINR_0 = \frac{P_0}{\sum_{j \neq 0} P_j + N}$$ [Equation 4]

$$E\_SINR_i = \frac{P_i}{\sum_{j \neq 0, j \neq i} P_j + N}$$

where N may denote a noise power.

Referring to Equation 4, a numerator of $SINR_0$, $P_0$, may be associated with the signal of the serving BS0, and $$\sum_{j \neq 0} P_j$$

may be associated with an interference, generated by neighbor BSs, in the MS. Measuring $$\sum_{j \neq 0} P_j$$

by the MS may indicate that the MS measures data signals transmitted by the neighbor BSs using a particular RE, when the serving BS0 transmits a reference signal using the same RE.

Also, a numerator of $E\_SINR_i$, $P_i$, may be associated with the signal of the neighbor BS i, and $$\sum_{j \neq 0, j \neq i} P_j$$

may be associated with an interference, generated with respect to the neighbor BS i, in the MS. However, $$\sum_{j \neq 0, j \neq i} P_j$$

may not indicate interferences, generated with respect to the neighbor BS i, in the MS. That is, $$\sum_{j \neq 0, j \neq i} P_j$$

may indicate the interference, generated with respect to the neighbor BS i, in the MS, excluding an interference generated by the serving BS0 with respect to the neighbor BS i.

Figure 5:
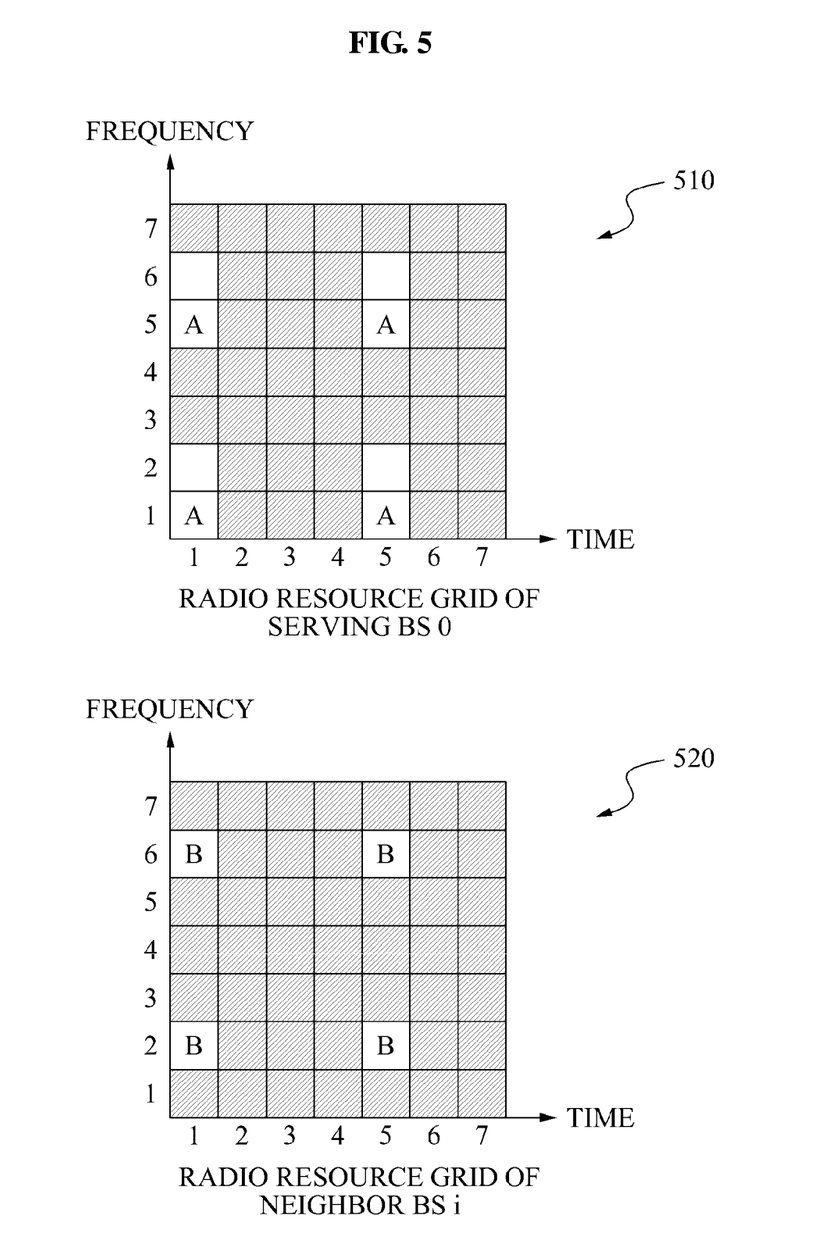
FIG. 5 is a diagram illustrating an example of radio resource grids that describe a neighbor base station (BS) transmitting reference signals using a radio resource which is not used by a serving BS.

Radio resource grids as illustrated in FIG. 5 may be designed to measure $SINR_0$ and $E\_SINR_i$, which are described below.

FIG. 5 illustrates an example of radio resource grids that describe a neighbor BS transmitting reference signals using a radio resource which is not used by a serving BS.

As shown in FIG. 5, a radio resource grid 510 is associated with a serving BS0, and a radio resource grid 520 is associated with a neighbor BS i.

Each of the grids 510 and 520 includes 49 (7×7) REs. Grey REs may be used to transmit data signals, and white REs may not be used by a corresponding BS. For example, a RE of (1, 2) or (1, 6), indicating (time, frequency), may not be used by the serving BS0. The serving BS0 may discontinue transmitting/receiving a data signal in the RE.

Reference signals A of the serving BS0 and reference signals B of the neighbor BS i may be designed to have different patterns. Accordingly, $SINR_0$ may be measured in REs corresponding to the reference signals A of the serving BS0. Here, the REs corresponding to the reference signals A may be REs of (1, 1), (1, 5), (5, 1), and (5, 5), indicating (time, frequency).

Also, $E\_SINR_i$ may be measured when the serving BS0 does not transmit the same frequency as neighbor BS i while the neighbor BS i transmits the reference signals. For example, the neighbor BS i may transmit the reference signal B using the RE of (1, 2) in the grid 520. In this case, the serving BS0 may not use the RE of (1, 2) in the grid 510, which indicates that transmission/receiving of data signal is discontinued in the RE of (1, 2), indicating (time, frequency).

When the MS measures $SINR_0$ and $E\_SINR_i$ in grids 510 and 520, as illustrated in FIG. 5, the measured $SINR_0$ and $E\_SINR_i$ may be reported to the serving BS0. In this case, the serving BS0 may determine whether to apply a CoMP by comparing $SINR_0$ and $E\_SINR_i$. In particular, the serving BS0 may predict an increase in a transmission rate of the MS according to the CoMP based on $SINR_0$ and $E\_SINR_i$, and determine whether to apply the CoMP based on the predicted increase in the transmission rate.

For example, the serving BS0 may determine that the CoMP is to be applied when the CoMP determines the increase in the transmission rate of the MS is greater than a particular level. Here, the particular level may be adjusted based on an overhead occurring since the CoMP is performed. Another example, the serving BS0 may determine that the CoMP is to be applied when a transmission rate is greater than a transmission rate when the CoMP is not applied.

In general, the serving BS0 may prepare a criterion which is associated with an evaluation of the increase in the transmission rate of the MS according to the CoMP. That is, when the criterion is satisfied, it may be determined that the increase in the transmission rate is greater than the particular level, and the serving BS0 may determine that the CoMP is to be applied. Conversely, when the criterion is not satisfied, it may be determined that the increase in the transmission rate is equal to or less than the particular level, and the serving BS0 may determine that the CoMP is not to be applied.

In this case, a computation scheme may depend on a CoMP algorithm; the serving BS0 may prepare other criteria based on the CoMP algorithm. The CoMP algorithm has been described above, and criteria according to examples of the CoMP algorithm such as coordinated silencing, coordinated scheduling/beamforming, joint processing/transmission, and the like are described.

(1) A criterion used to determine that the CoMP is to be applied according to a coordinated silencing algorithm, when the CoMP is not applied.

Here, a transmission rate of a MS when the CoMP is applied to the coordinated silencing algorithm is to be greater than a transmission rate of the MS when the CoMP is not applied. Accordingly, when a criterion of Equation 5 is satisfied, it may be determined that the CoMP is to be applied according to the coordinated silencing algorithm when the CoMP is not applied.

$$\log_2\left(1 + \frac{P_0}{\sum_{j \neq 0} P_j + N}\right) \leq \frac{1}{2}\log_2\left(1 + \frac{P_0}{\sum_{j \neq 0, j \neq i} P_j + N}\right) \quad \text{[Equation 5]}$$

The criterion of Equation 5 may be equal to a criterion of Equation 6.

$$SINR_0 \leq E\_SINR_i - 1 \quad \text{[Equation 6]}$$

Accordingly, a serving BS0 may ascertain whether the criterion of Equation 5 or the criterion of Equation 6 is satisfied based on $SINR_0$ and $E\_SINR_i$. Also, it may be determined whether the serving BS0 and the neighbor BS i perform the CoMP based on the coordinated silencing algorithm according to a result of the ascertaining.

In this case, the criterion of Equation 5 or the criterion of Equation 6 may change by providing a weight to at least one of $SINR_0$ and $E\_SINR_i$ based on an overhead that may additionally occur. That is, a new criterion may be represented as, $$\alpha \cdot SINR_0 \leq E\_SINR_i - 1 \quad \text{[Equation 7]}$$

$$SINR_0 \leq E\_SINR_i - 1 - \alpha \quad \text{[Equation 8]}$$

Here, $\alpha$ may be an adjustable parameter, and may be a weight that may change the above-described criteria. Also, $\alpha$ may be adaptively adjusted based on an overhead. For example, when a channel significantly changes due to various factors such as an increase in a movement speed of a MS, a feedback overhead of the MS may increase, and thus $\alpha$ may be adjusted.

(2) A criterion used to determine that the CoMP is to be applied according to a joint processing/transmission algorithm, when the CoMP is not applied.

A transmission rate of a MS when the CoMP is applied is to be greater than a transmission rate of the MS when the CoMP is not applied. Accordingly, when a criterion of Equation 9 is satisfied, it may be determined that the CoMP is to be applied according to the joint processing/transmission algorithm when the CoMP is not applied.

$$\log_2\left(1 + \frac{P_0}{\sum_{j \neq 0} P_j + N}\right) \leq \frac{1}{2}\log_2\left(1 + \frac{P_0 + P_i}{\sum_{j \neq 0, j \neq i} P_j + N}\right) \quad \text{[Equation 9]}$$

Equation 9 may be represented as, $$SINR_0 \leq E\_SINR_i \quad \text{[Equation 10]}$$

A serving BS0 may ascertain whether the criterion of Equation 9 or the criterion of Equation 10 is satisfied based on $SINR_0$ and $E\_SINR_i$. Also, it may be determined whether the serving BS0 and a neighbor BS i perform the CoMP based on the joint processing/transmission algorithm according to a result of the ascertaining.

Equation 10 may be appropriately changed by an overhead that may occur. For example, Equation 10 may change to Equation 11 or Equation 12:

$$\alpha \cdot SINR_0 \leq E\_SINR_i \quad \text{[Equation 11]}$$

$$SINR_0 \leq E\_SINR_i - \alpha \quad \text{[Equation 12]}$$

$\alpha$ has been described above.

(3) A criterion used to determine that the CoMP is to be applied according to a coordinated scheduling/beamforming algorithm, when the CoMP is not applied.

A transmission rate of a MS when the CoMP is applied according to the coordinated scheduling/beamforming algorithm is to be greater than a transmission rate of the MS when the CoMP is not applied. Accordingly, when a criterion of Equation 13 is satisfied, it may be determined that the CoMP is to be applied according to the coordinated scheduling/beamforming algorithm when the CoMP is not applied. Equation 13 may be represented as:

$$\log_2\left(1 + \frac{P_0}{\sum_{j \neq 0} P_j + N}\right) \leq \frac{1}{2}\log_2\left(1 + \frac{P_0}{P_i^- + \sum_{j \neq 0, j \neq i} P_j + N}\right) - \Delta \quad \text{[Equation 13]}$$

where $P_i^-$ may be less than $P_i$, and $\Delta$ may be a reduction of a transmission rate due to the overhead. Equation 13 may be represented as:

$$SINR_0 \leq \lambda \quad \text{[Equation 14]}$$

Referring to Equation 14, $\lambda$ may be a predetermined threshold value, and the MS may measure $SINR_0$ from a serving BS0, and determine whether to apply the CoMP depending on whether the measured $SINR_0$ is greater than $\lambda$. Also, the serving BS0 may determine whether to apply the CoMP depending on whether $SINR_0$, reported by the MS, is greater than $\lambda$.

(4) A criterion used to determine that the CoMP is to be applied according to a coordinated silencing algorithm, when the CoMP is being applied according to a coordinated scheduling/beamforming algorithm.

The CoMP may be performed according to any one of a plurality of algorithms. Hereinafter, the plurality of algorithms may be referred to as a plurality of modes.

In this case, a mode for the CoMP may be adaptively changed. For example, the CoMP applied according to the coordinated scheduling/beamforming algorithm may change to the CoMP applied according to the coordinated silencing algorithm. Criteria, associated with evaluating an increase in a transmission rate according to a change from a current mode to a particular mode, may be used to determine whether the mode change is appropriate. According to example implementations, the criteria associated with the mode change are provided.

A criterion, used to determine the change from the CoMP applied according to the coordinated scheduling/beamforming algorithm to the CoMP applied according to the coordinated silencing algorithm, may be approximately identical to Equation 6, Equation 7, and Equation 8. That is, a serving BS0 may determine the change from the CoMP applied according to the coordinated scheduling/beamforming algorithm to the CoMP applied according to the coordinated silencing algorithm by comparing $SINR_0$ and $E\_SINR_i$.

However, since the CoMP is being applied according to the coordinated scheduling/beamforming algorithm, the measured $SINR_0$ may change, and $\alpha$ may also be differently set. The serving BS0 and a neighbor BS i may determine whether the change to the coordinated silencing algorithm is appropriate using the criteria of Equation 6, Equation 7, and Equation 8 excluding the various $SINR_0$ and $\alpha$.

(5) A criterion used to determine that the CoMP is to be applied according to a joint processing/transmission algorithm, when the CoMP is being applied according to a coordinated scheduling/beamforming algorithm.

A criterion, used to determine the change from the CoMP applied according to the coordinated scheduling/beamforming algorithm to the CoMP applied according to the joint processing/transmission algorithm, may be approximately identical to Equation 10, Equation 11, and Equation 12. That is, a serving BS0 may determine the change from the CoMP applied according to the coordinated scheduling/beamforming algorithm to the CoMP applied according to the joint processing/transmission algorithm by comparing $SINR_0$ and $E\_SINR_i$.

However, since the CoMP is being applied according to the coordinated scheduling/beamforming algorithm, the measured $SINR_0$ may change, and a may also be differently set.

(6) A criterion used to determine that the CoMP is to be applied according to a joint processing/transmission algorithm, when the CoMP is being applied according to a coordinated silencing algorithm.

In this case, the criteria of Equation 6, Equation 7, and Equation 8, and the criteria of Equation 10, Equation 11, and Equation 12 may be considered. That is, a serving BS0 may satisfy at least one of the criteria of Equation 6, Equation 7, and Equation 8, and the criteria of Equation 10, Equation 11, and Equation 12, based on a measured $SINR_0$, an amount of generated overhead, and a set α.

Any one of the coordinated silencing algorithm and the joint processing/transmission algorithm may be selected depending on which criterion is satisfied. For example, when any one of the criteria of Equation 6, Equation 7, and Equation 8 is satisfied, the coordinated silencing algorithm may be selected. When any one of the criteria of Equation 10, Equation 11, and Equation 12 is satisfied, the joint processing/transmission algorithm may be selected.

However, when all the criteria of Equation 6, Equation 7, Equation 8, Equation 10, Equation 11, and Equation 12 are satisfied, any one of the coordinated silencing algorithm and the joint processing/transmission algorithm may be randomly selected.

Figure 6:
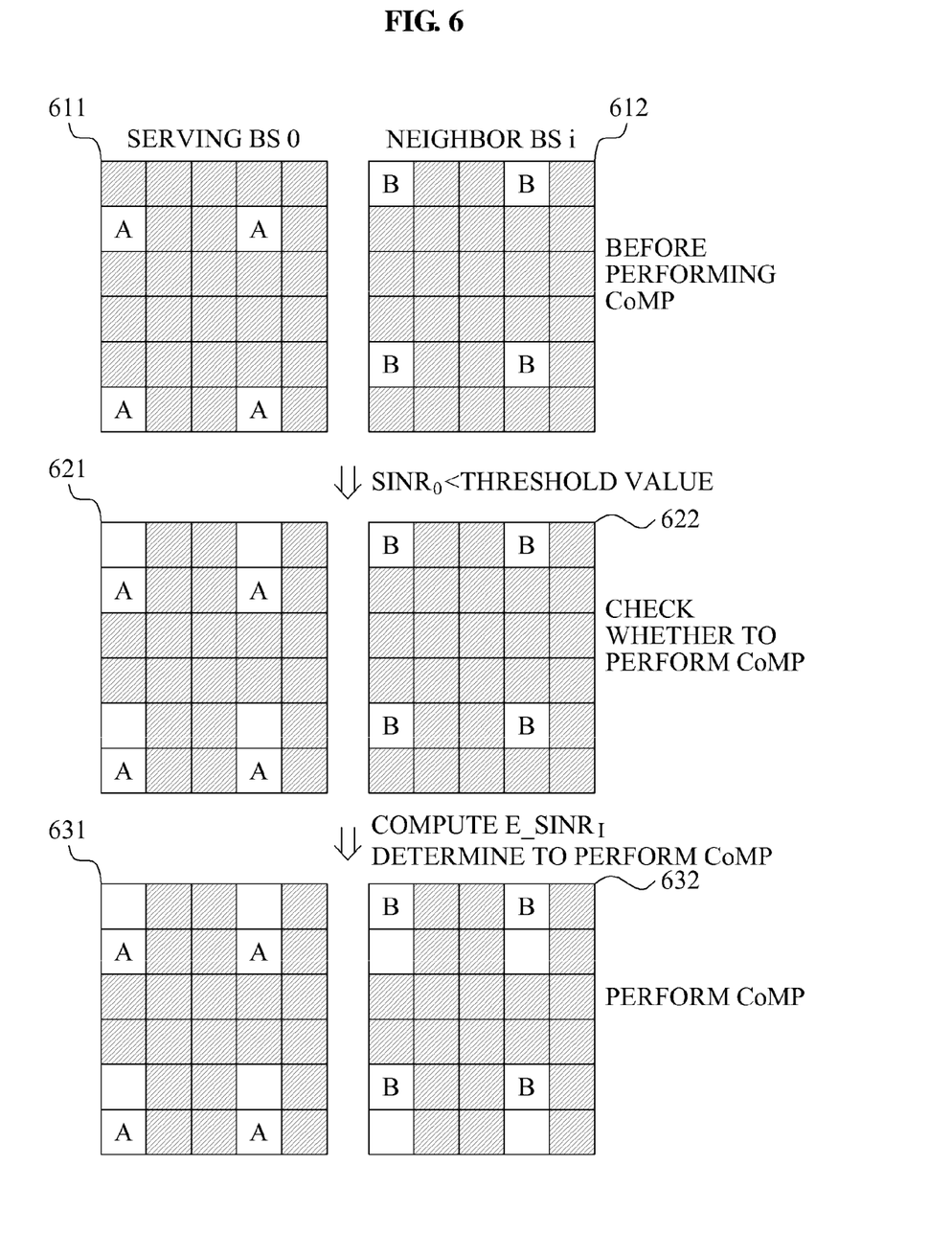
FIG. 6 is a diagram illustrating an example of radio resource grids associated with an operation of determining whether to perform a CoMP using a clustering algorithm, when two cells exist.

FIG. 6 illustrates an example of radio resource grids associated with an operation of determining whether to perform a CoMP using a clustering algorithm, when two cells exist.

As shown in FIG. 6, grids 611 and 612 are associated with radio resources a serving BS0 and a neighbor BS i used before performing the CoMP. Grey REs may be used to transmit data signals.

According to exemplary implementations, REs used when the serving BS0 transmits reference A signals may be used when the neighbor BS i transmits data signals.

In this case, a MS may periodically measure $SINR_0$ based on the reference A signals transmitted from the serving BS0. Similarly, the MS may periodically measure $E\_SINR_i$ based on reference B signals transmitted from the neighbor BS i. Here, the reference A signals and the reference B signals may be transmitted using different radio resources.

$SINR_0$ may be less than a threshold value while $SINR_0$ is periodically measured. $SINR_0$ less than the threshold value may indicate that the CoMP is to be performed or a mode for the CoMP may be changed.

As shown in FIG. 6, grids 621 and 622 may be associated with a radio resource used to check whether it is appropriate that the serving BS0 and the neighbor BS i perform the CoMP or whether a mode change is appropriate. Grey REs may be used to transmit data signals, and white REs may not be used by a corresponding BS.

Grid 611 may change to grid 621 while checking whether to perform the CoMP is appropriate. That is, the MS may measure $E\_SINR_i$ when an interference of the serving BS0 with respect to the neighbor BS i is non-existent in substance or removed. $E\_SINR_i$ may be included in expected CQI.

Referring to the grids 621 and 622, it may be ascertained that the serving BS0 discontinues transmitting/receiving the data signals in a frequency and time when the neighbor BS i transmits reference B signals.

It may be determined whether it is appropriate that the serving BS0 and the neighbor BS i perform the CoMP or whether the mode change is appropriate, based on the measured $E\_SINR_i$. When it is determined that the CoMP is to be performed, the serving BS0 and the neighbor BS i may use grids 631 and 632.

Referring to grids 631 and 632, the serving BS0 and the neighbor BS i may transmit/receive the data signals using the same RE, while the serving BS0 and the neighbor BS i performs the CoMP. However, when the serving BS0 transmits reference A signals, the neighbor BS i may discontinue transmitting/receiving the data signals. When the neighbor BS i transmits reference B signals, the serving BS0 may discontinue transmitting/receiving the data signals.

Figure 7:
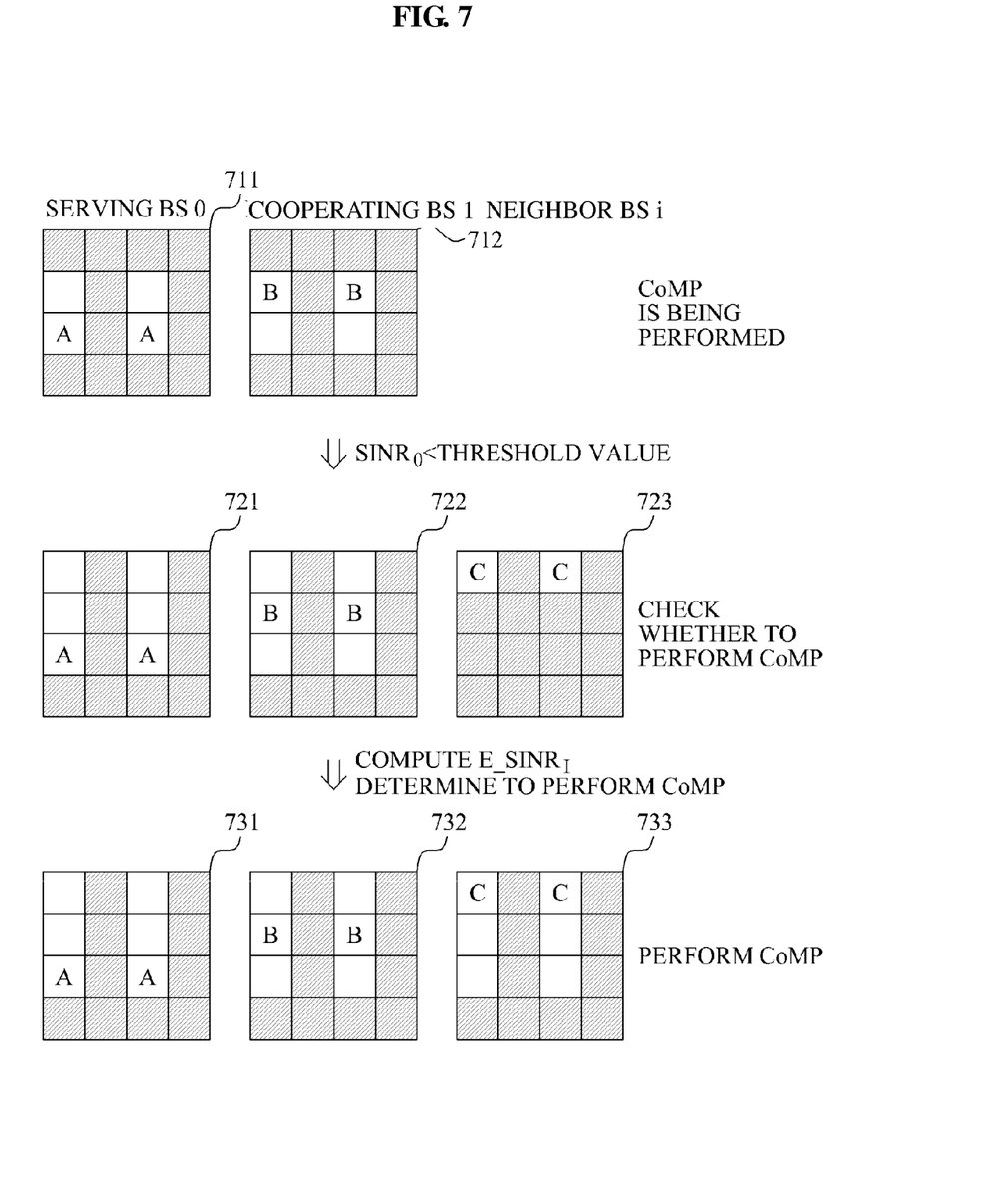
FIG. 7 is a diagram illustrating an example of radio resource grids associated with an operation of determining whether another cell may additionally perform a CoMP, while two cells are performing the CoMP.

FIG. 7 illustrates radio resource grids associated with an operation of determining whether another cell may additionally perform a CoMP, while two cells are performing the CoMP.

As shown in FIG. 7, it may be assumed that a serving BS0 and a cooperating BS1 are performing the CoMP. Also, it may be assumed that the serving BS0 may determine whether to additionally select a neighbor BSi as a BS joining the CoMP.

Referring to grids 711 and 712, the serving BS0 and the cooperating BS1, currently performing the CoMP, may transmit/receive data signals using same REs. However, when the serving BS0 transmits reference A signals, the cooperating BS1 may discontinue transmitting/receiving the data signals. When the cooperating BS1 transmits reference B signals, the serving BS0 may discontinue transmitting/receiving the data signals.

The serving BS0 may continuously monitor $SINR_0$ reported by a MS. When $SINR_0$ is less than a threshold value, the serving BS0 may check whether it is appropriate that a neighbor BS i additionally joins the CoMP. In this case, the grid 711 is changed to a grid 721, and the grid 712 is changed to a grid 722. Also, a grid 723 may be associated with the neighbor BS i.

Referring to the grid 721, the serving BS0 may additionally assign empty (unused) REs to prevent an interference with respect to the neighbor BS i from being generated. That is, a RE, used when the neighbor BS i transmits reference C signals, may not be used by the serving BS0. Referring to the grid 722, the cooperating BS1 may additionally assign empty (unused) REs to prevent an interference with respect to the neighbor BS i from being generated. That is, a RE, used when the neighbor BS i transmits the reference C signals, may not be used by the cooperating BS1.

In this case, the MS may measure $E\_SINR_i$ of the neighbor BS i, and report $E\_SINR_i$ to the serving BS0. The serving BS0 may check whether the neighbor BS i is eligible to additionally join the CoMP based on the reported $E\_SINR_i$.

When the neighbor BS i is eligible to additionally join the CoMP, the grid 723 may be changed to a grid 733. Also, the serving BS0, the cooperating BS1, and the neighbor BS i may perform the CoMP. In this case, the serving BS0 and the cooperating BS1 may use the grids 731 and 732. Accordingly, the three BSs may perform the CoMP.

Figure 8:
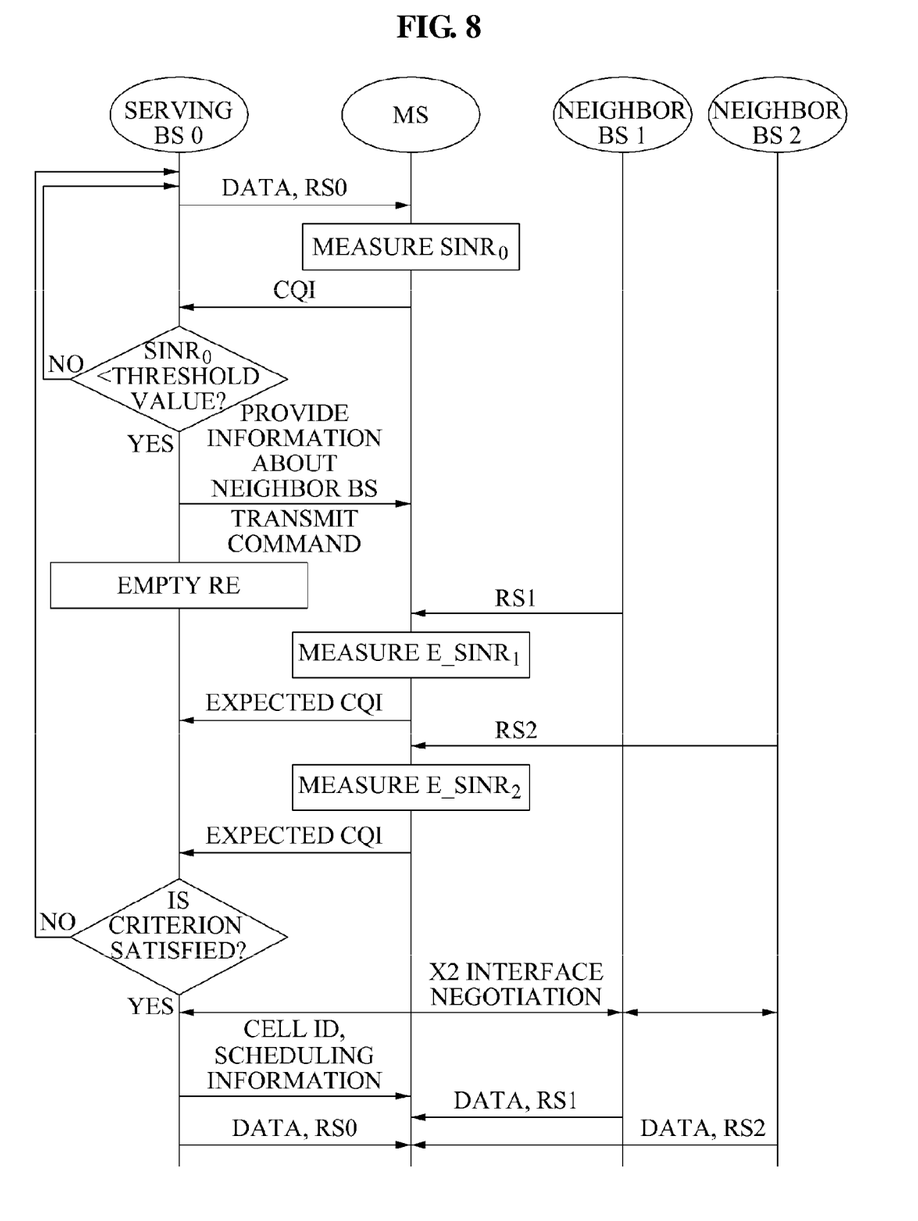
FIG. 8 is a flowchart illustrating an exemplary operation method of a serving BS, a mobile station (MS), and a neighbor BSs.

FIG. 8 illustrates a flowchart of an operation method of a serving BS, a MS, and a neighbor BSs.

As shown in FIG. 8, the serving BS0 may transmit to the MS, data signals and reference signals RS0 using radio resource assigned as illustrated in grid 611 of FIG. 6. In this case, the MS may periodically measure $SINR_0$.

The MS may periodically and sporadically report the measured $SINR_0$ as CQI. In this case, the serving BS0 may determine whether $SINR_0$ is less than a threshold value. When $SINR_0$ is greater than the threshold value, an initial operation, that is, the transmitting of the data signals and the reference signals, may be performed again. When $SINR_0$ is less than the threshold value, the serving BS0 may provide the MS with information about neighbor BSs, and instruct the MS to measure and report expected CQI, $E\_SINR_i$.

Here, the information about the neighbor BSs may be used when the MS computes $E\_SINR_i$. For example, the information about the neighbor BSs may include cell identification (ID) information, scheduling information, information about reference signals, and the like of the neighbor BSs. Also, the information about the neighbor BSs may be transmitted to the MS through a physical downlink control channel (PDCCH).

However, unlike the MS as described with reference to FIG. 8, the MS may determine whether $SINR_0$ is less than the threshold value. In this case, the serving BS0 may not instruct the MS to measure and report $E\_SINR_i$. When $SINR_0$ is less than the threshold value, the MS may automatically report $E\_SINR_i$ to the serving BS0.

Before the MS measures $E\_SINR_i$, the serving BS0 may empty REs corresponding to reference signals of the neighbor BSs. That is, the serving BS0 may discontinue transmitting/receiving the data signals using the REs corresponding to the reference signals of the neighbor BSs.

As shown in FIG. 8, when the serving BS0 empties the REs corresponding to the reference signals of the neighbor BSs, the MS may measure $E\_SINR_1$ using a reference signal 1, RS1, transmitted from a neighbor BS1. The measured $E\_SINR_1$ may be provided to the serving BS0 as expected CQI of the neighbor BS1. Here, the MS may report $E\_SINR_1$ using a predetermined feedback control channel. A radio resource, used when the MS reports $E\_SINR_1$ using the feedback control channel, may be assigned by the serving BS0. In particular, the radio resource may be used only for reporting $E\_SINR_1$.

Also, the MS measures $E\_SINR_2$ using a reference signal 2, RS2, transmitted from a neighbor BS2. The measured $E\_SINR_2$ may be provided to the serving BS0 as expected CQI of the neighbor BS2. Here, the MS may report $E\_SINR_2$ using a predetermined feedback control channel. A radio resource, used when the MS reports $E\_SINR_2$ using the feedback control channel, may be assigned by the serving BS0.

The information about the neighbor BSs may be used when the MS measures $E\_SINR_1$ and $E\_SINR_2$.

The serving BS0 may determine whether the neighbor BS1 and the neighbor BS2 are eligible to join the CoMP using predetermined criteria associated with an evaluation of an increase in a transmission rate. That is, when the criteria are not satisfied, the initial operation may be performed again. When the criteria are satisfied, it may be determined that the neighbor BS1 and the neighbor BS2 are eligible to join the CoMP.

When it is determined that the neighbor BS1 and the neighbor BS2 are eligible to join the CoMP, the serving BS0 may finally negotiate with the neighbor BSs for the CoMP. In this case, the serving BS0 may negotiate with the neighbor BSs using an X2 interface. When the negotiation is completed, scheduling information associated with the CoMP, cell information such as a cell ID of the CoMP, and the like may be determined, and provided to the MS.

Finally, the serving BS0, the neighbor BS1, and the neighbor BS2 may perform the CoMP. That is, the serving BS0, the neighbor BS1, and the neighbor BS2 may transmit the data signals and the reference signals using the radio resource assigned as illustrated in the grids 731, 732, and 733 of FIG. 7.

Figure 9:
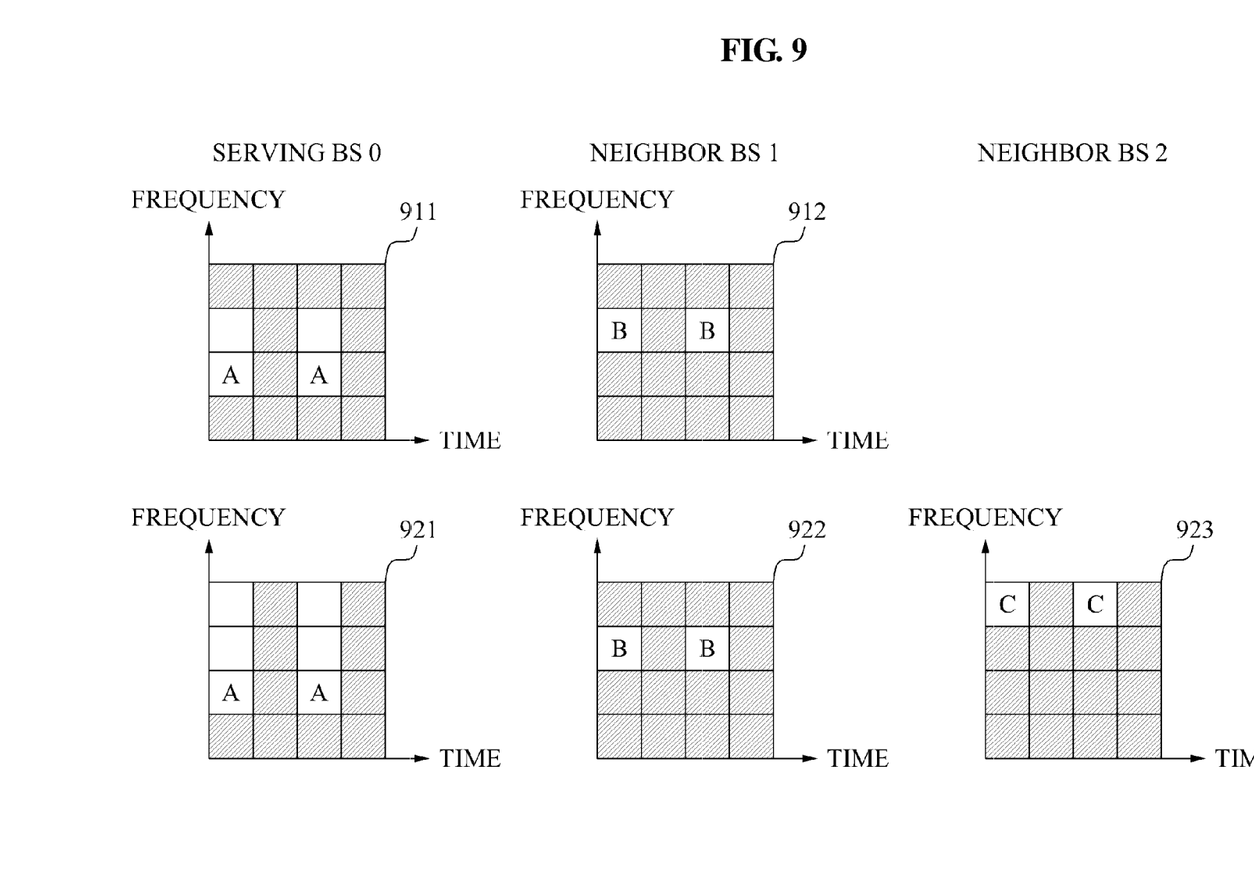
FIG. 9 is a diagram illustrating an example of radio resource grids including empty resource elements distributed in various forms.

FIG. 9 illustrates an example of radio resource grids including empty REs distributed in various forms.

As shown in FIG. 9, the empty REs may be distributed in various forms.

Referring to grids 911 and 912, a MS may measure $E\_SINR_1$ of a neighbor BS1 during a single time period. That is, a serving BS0 and the neighbor BS1 may simultaneously transmit reference A signals and reference B signals. However, frequencies corresponding to the reference A signals and the reference B signals are different from each other, and the serving BS0 may not transmit data signals in the frequencies corresponding to the reference B signals. Accordingly, the MS may accurately measure $E\_SINR_1$ of the neighbor BS1.

Referring to grids 921, 922, and 923, the MS may measure expected CQI about two neighbor BSs during a single time period. That is, the serving BS0 may not transmit/receive data signals in frequencies corresponding to the reference B signals and reference C signals. Accordingly, the MS may measure $E\_SINR_1$ and $E\_SINR_2$ with respect to the neighbor BS1 and the neighbor BS2 in a single time period.

According to example(s) described above, a method of determining which neighbor base stations have joined a CoMP, and a standard of qualification for joining a CoMP are provided.

The above-described methods may be recorded, or fixed in one or more computer-readable storage media that includes program instructions to be implemented by a computer to cause a processor to execute or perform the program instructions. The media may also include, independent or in combination with the program instructions, data files, data structures, and the like. Examples of computer-readable media may include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like Examples of program instructions include both machine code, such as produced by a compiler, and files containing higher level code that may be executed by the computer using an interpreter. The described hardware devices may be configured to act as one or more software modules in order to perform the methods and/or operations described above, or vice versa. In addition, a computer-readable storage medium may be distributed among computer systems connected through a network and computer-readable codes or program instructions may be stored and executed in a decentralized manner.

A number of exemplary implementations have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method of clustering a coordinated multipoint transmission of a serving base station, the method comprising:

emptying a resource element of the serving base station that corresponds to a signal transmitted from a neighbor base station to a mobile station, before the mobile station computes expected channel quality information of the signal transmitted from the neighbor base station to the mobile station;

receiving, from the mobile station, channel quality information of a signal transmitted from the serving base station to the mobile station, and the expected channel quality information;

comparing the channel quality information with the expected channel quality information; and determining whether the neighbor base station is eligible to perform the coordinated multipoint transmission with the serving base station based on a result of the comparing.

2. The clustering method of claim 1, wherein the determining comprises:
checking whether a criterion, associated with an evaluation of an increase in a transmission rate of the mobile station according to the coordinated multipoint transmission, is satisfied based on the result of the comparing; and
determining whether the neighbor base station is eligible to perform the coordinated multipoint transmission based on a result of the checking.

3. The clustering method of claim 1, wherein the determining comprises:
predicting an increase in a transmission rate of the mobile station according to the coordinated multipoint transmission based on the result of the comparing; and
determining whether the neighbor base station is eligible to perform the coordinated multipoint transmission based on the predicted increase in the transmission rate.

4. The clustering method of claim 1, wherein, when the coordinated multipoint transmission is performed in a plurality of modes, the determining comprises:
checking whether a criterion, associated with an evaluation of an increase in a transmission rate according to a change from a current mode of the coordinated multipoint transmission to a particular mode, is satisfied based on the result of the comparing; and
determining whether the neighbor base station is eligible to perform the coordinated multipoint transmission in the particular mode based on a result of the checking.

5. The clustering method of claim 1, wherein the mobile station computes the expected channel quality information based on the signal transmitted by the neighbor base station in a radio resource region that is not used by the serving base station.

6. The clustering method of claim 1, wherein the determining comprises:
providing a weight to the expected channel quality information, or the channel quality information, or any combination thereof.

7. The clustering method of claim 1, wherein the receiving comprises:
acquiring periodically the expected quality information, or acquiring the expected channel quality information after instructing the mobile station to report the expected channel quality information.

8. The clustering method of claim 1, further comprising:
providing, by the serving base station, the mobile station with information about the neighbor base station to enable the mobile station to compute the expected channel quality information.

9. The clustering method of claim 1, further comprising:
instructing, by the serving base station, the mobile station to report the expected channel quality information based on the channel quality information.

10. The clustering method of claim 1, further comprising:
providing the mobile station with scheduling information to perform the coordinated multipoint transmission, or cell information of the coordinated multipoint transmission, when the neighbor base station is determined to be eligible to perform the coordinated multipoint transmission with the serving base station.

11. The clustering method of claim 1, wherein:
the expected channel quality information comprises information about a signal to interference plus noise ratio of the signal transmitted from the neighbor base station to the mobile station; and
the mobile station computes the signal to interference plus noise ratio when an interference of the serving base station with respect to the neighbor base station is nonexistent in substance or removed.

12. The clustering method of claim 1, wherein the comparing comprises:
determining whether the expected channel quality information, or the expected channel quality information subtracted by one, is greater than or equal to the channel quality information.

13. A method of clustering a coordinated multipoint transmission of a serving base station, the method comprising:
emptying a resource element of the serving base station that corresponds to a signal transmitted from a neighbor base station to a mobile station, before the mobile station computes expected channel quality information of the signal transmitted from the neighbor base station to the mobile station;
obtaining, from the mobile station, channel quality information of a signal transmitted from the serving base station to the mobile station, and the expected channel quality information;
comparing the channel quality information with the expected channel quality information;
checking whether a first criterion, associated with an evaluation of an increase in a transmission rate according to the coordinated multipoint transmission of the neighbor base station and the serving base station, or a second criterion, associated with an evaluation of an increase in a transmission rate according to a change from a current mode of the coordinated multipoint transmission to a particular mode, is satisfied based on a result of the comparing; and
determining whether the neighbor base station is eligible to perform the coordinated multipoint transmission with the serving base station, or whether the neighbor base station is eligible to perform the coordinated multipoint transmission in the particular mode, based on a result of the checking.

14. The clustering method of claim 13, wherein the mobile station computes the expected channel quality information based on the signal transmitted by the neighbor base station in a radio resource region that is not used by the serving base station.

15. An operation method of a mobile station for a coordinated multipoint transmission, the method comprising:
computing expected channel quality information of a signal transmitted from a neighbor base station to the mobile station, in response to a serving base station emptying a resource element of the serving base station that corresponds to the signal transmitted from the neighbor base station to the mobile station; and
reporting, to the serving base station, channel quality information of a signal transmitted from the serving base station to the mobile station, and the expected channel quality information, to enable the serving base station to compare the channel quality information with the expected channel quality information, and determine whether the neighbor base station and the serving base station perform the coordinated multipoint transmission based on a result of the comparison.

16. The operation method of claim 15, wherein the reporting comprises:
reporting the expected channel quality information based on the channel quality information.

17. The operation method of claim 15, wherein the computing comprises:
computing the expected channel quality information based on the signal transmitted by the neighbor base station in a radio resource region that is not used by the serving base station.

18. The operation method of claim 15, further comprising:
receiving scheduling information to perform the coordinated multipoint transmission, or cell information of the coordinated multipoint transmission, when the neighbor base station and the serving base station are determined to perform the coordinated multipoint transmission.

19. The operation method of claim 15, wherein the reporting comprises:
reporting the expected channel quality information using a predetermined feedback control channel.

20. The operation method of claim 15, wherein the computing comprises:
computing the expected channel quality information in a resource element of the neighbor base station that is used to transmit the signal from the neighbor base station to the mobile station.

21. An operation method of a mobile station for a coordinated multipoint transmission, the method comprising:
computing expected channel quality information of a signal transmitted from a neighbor base station to the mobile station, in response to an interference of a serving base station with respect to the neighbor base station being non-existent in substance or removed; and
reporting, to the serving base station, channel quality information of a signal transmitted from the serving base station to the mobile station, and the expected channel quality information using a predetermined feedback control channel, to enable the serving base station to compare the channel quality information with the expected channel quality information, and determine whether the neighbor base station and the serving base station perform the coordinated multipoint transmission based on a result of the comparison,
wherein the serving base station assigns a radio resource used to report the expected channel quality information using the predetermined feedback control channel.

22. A non-transitory computer-readable storage medium storing a program to implement a method of clustering a coordinated multipoint transmission of a serving base station, the method comprising:
emptying a resource element of the serving base station that corresponds to a signal transmitted from a neighbor base station to a mobile station, before the mobile station computes expected channel quality information of the signal transmitted from the neighbor base station to the mobile station;
receiving, from the station, channel quality information of a signal transmitted from the serving base station to the mobile station, and the expected channel quality information;
comparing the channel quality information with the expected channel quality information; and
determining whether the neighbor base station is eligible to perform the coordinated multipoint transmission with the serving base station based on a result of the comparing.

* * * * *